Dec. 16, 1941.   R. V. STEVENS   2,266,664
METHOD OF AND APPARATUS FOR KEEPING LOBSTERS
Filed Nov. 14, 1939
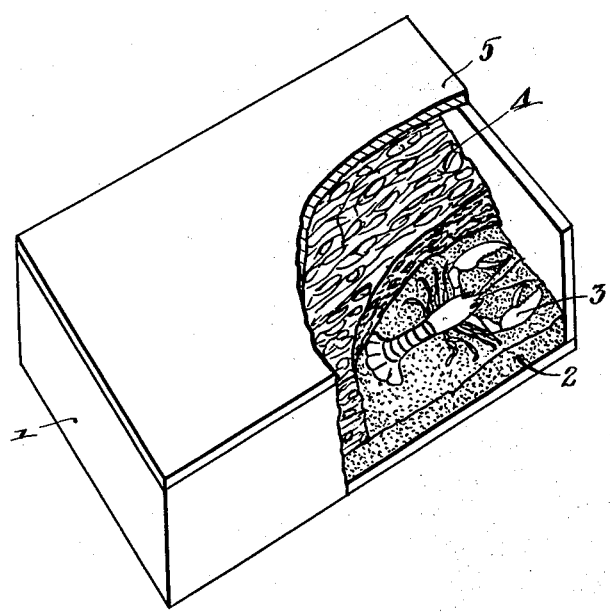
Inventor:
Robert V. Stevens,
By Roberts, Cushman & Woodbury
his Attys.

Patented Dec. 16, 1941

2,266,664

UNITED STATES PATENT OFFICE 2,266,664

METHOD OF AND APPARATUS FOR KEEPING LOBSTERS

Robert V. Stevens, Owl's Head Harbour, Nova Scotia, Canada, assignor, by mesne assignments, to North Atlantic Associates, a voluntary trust association Application November 14, 1939, Serial No. 304,429

9 Claims. (Cl. 119—2)

This invention relates to a method of and apparatus for keeping lobsters alive and in good condition and more especially when intended for future use as a food.

It is an object of this invention to provide a simple method of procedure and an inexpensive equipment, for keeping live lobsters. It is also an object to keep lobsters alive longer than has heretofore been known and practiced, particularly in the course of shipment and after delivery to the ultimate consumer. It is also an object to keep the lobsters in better physical condition and hence render them better for food purposes than heretofore. Other objects will appear from the following disclosure.

In accordance with this invention, I have found that if live lobsters, as removed from the ocean or from so-called lobster "pounds" in which they are kept in running salt water, are placed upon a bed of sawdust, which has been freshly and thoroughly wet with clean fresh sea water, and then covered with a layer of fresh seaweed, also wet with sea water, they will keep alive and in healthy condition, at temperatures maintained substantially continuously below 55° F., for at least four days. This is definitely longer than the period which a lobster will survive when placed in seaweed and ice in the customary way. However, it is given as a minimum of the period for which lobsters may be kept alive by the present treatment, for in actual tests, lobsters as thus treated and kept have lived and continued in good condition for ten days by this method.

It is important that the sawdust should be obtained from woods which are free from sap or other constituents which might be leached out by the salt water and affect the lobsters deleteriously. Accordingly, the sawdust from birch or other hardwood is recommended, whereas the sawdust from pine should not be used.

Moreover, the sawdust to be used should first be thoroughly and completely dried, as by the prolonged application of artificial heat, although this may be done upon the lumber before the sawdust is made therefrom. Accordingly, sawdust from the sawing of freshly kiln-dried birch or other hardwood lumber is especially to be preferred and recommended. A further precaution, to avoid bark and adjacent layers, may be desirable but is usually not necessary.

In the practical application of my invention, therefore, I take a wooden box 1, as illustrated in the accompanying drawing (with parts broken away) and provide a layer of fresh, kiln-dried birch or other hardwood sawdust 2, sufficient to cover the bottom two inches or more deep. I may then sprinkle the sawdust with fresh cold sea water as taken from the ocean (i. e., not from small inlets or harbors where it may be warm or polluted) until the sawdust is thoroughly wet or saturated therewith.

It may be more convenient to wet the sawdust before spreading it in the box, and if so this is equally satisfactory, except that the sawdust should only be wetted immediately before it is to be charged into the box and the lobsters placed thereon.

The lobsters 3 are then placed upon the wetted layer of sawdust, preferably without piling one upon another, and then covered with a thick but loose mass of seaweed 4, which may fill the box and is preferably also wet with cold fresh sea water. The box need not be covered, but it is thought that a cover 5 not only protects the lobsters mechanically but also serves to keep the moisture and gases from the moist sawdust around and in contact with the lobster longer and to advantage.

It appears that fresh, dried sawdust, such as from kiln-dried birch or other hardwood, when wet with cold fresh sea water, contains appreciable amounts of adsorbed oxygen and that when used for packing lobsters as above described, this oxygen is evolved gradually and is beneficial to the lobsters in prolonging their lives and in improving their life processes. That this or some other analogous effect, beneficial to the lobsters, is accomplished by the procedure is manifest, in view of the actual results obtained—namely, of prolonging their lives appreciably beyond the period which is possible with seaweed and like packing materials which have heretofore been used for this purpose, and of keeping them in improved physical condition in the meanwhile, during shipment or storage and in readiness for use.

Although the invention has been described above with specific reference to the problem of keeping lobsters alive (which is an especially exacting problem on account of the natural environment in which they live and the usually fatal consequences which promptly follow upon removing them from such environment) it may also be applied advantageously to other forms of commercial shellfish which are caught and distributed for food purposes, such as crabs, clams and oysters.

I claim:

1. Method of keeping live lobsters comprising the steps of providing a layer of freshly dried sawdust substantially free from water-soluble sap, moistened with cold, fresh sea water, placing the lobsters thereon, and keeping at a temperature which is maintained substantially continuously below 55° F.

2. Method of keeping live lobsters comprising the steps of providing a layer of freshly kiln-dried sawdust substantially free from water-soluble sap, moistened with cold, fresh sea water, placing the lobsters thereon, and keeping at a temperature which is maintained substantially continuously below 55° F.

3. Method of keeping live lobsters comprising the steps of providing a layer of freshly kiln-dried hardwood sawdust substantially free from sap, moistened with cold, fresh sea water, placing the lobsters thereon, and keeping at a temperature which is maintained substantilly continuously below 55° F.

4. Method of keeping live lobsters comprising the steps of providing a layer of freshly dried sawdust substantially free from water-soluble sap, moistened with cold, fresh sea water, placing the lobsters thereon, covering with a layer of seaweed, wet with sea water, and keeping at a temperature which is maintained substantially continuously below 55° F.

5. Method of keeping live lobsters comprising the steps of providing a layer of freshly dried sawdust substantially free from water-soluble sap, moistened with cold, fresh sea water, placing the lobsters thereon, and keeping at a temperature which is maintained substantially continuously below 55° F. and enclosing the whole in a container.

6. In combination, a layer of freshly dried sawdust substantially free from water-soluble sap, moistened with fresh, cold sea water, and a live lobster thereon.

7. In combination, a box containing a layer of freshly kiln-dried hardwood sawdust substantially free from sap, moistened with fresh, cold sea water, and a live lobster thereon.

8. In combination, a layer of freshly dried sawdust substantially free from water-soluble sap, moistened with fresh, cold sea water, and a live lobster thereon covered with a loose mass of seaweed.

9. In combination, a box containing a layer of freshly kiln-dried, birch sawdust, moistened with fresh, cold sea water, and a live lobster thereon, and a cover for said box.

ROBERT V. STEVENS.